Patented Feb. 6, 1945

2,368,649

UNITED STATES PATENT OFFICE 2,368,649

DEFLUORINATING ROCK PHOSPHATE

Kelly L. Elmore, Sheffield, Ala., assignor to Tennessee Valley Authority, a corporation of the United States of America No Drawing. Application October 23, 1941, Serial No. 416,204

3 Claims. (Cl. 71—47)

(Granted under the act of March 3, 1883, as amended April 30, 1928; 370 O. G. 757)

The invention herein described may be manufactured and used by or for the Government for governmental purposes without the payment to me of any royalty thereon.

This invention relates to defluorinating rock phosphate, particularly by the treatment of fused rock phosphate with water vapor until substantially all the fluorine is removed therefrom.

It has been proposed to treat rock phosphate heated to a temperature just below the sintering temperature of the rock in the presence of water vapor to remove fluorine. It has also been proposed to remove fluorine from rock phosphate fused in various types of apparatus, with or without the addition of fluxing oxides and under various conditions such as specific conditions for agitation and contact with water vapor. It is known that the addition of oxides of silicon, iron, aluminum, etc., to rock phosphate tends to lower the fusion temperature of the rock. However, indiscriminate addition of such oxides is not necessarily beneficial for either the removal of fluorine or rendering the phosphate available as plant food. For example, the addition of silica in amounts below a certain limit does not lower the fusion temperautre of the mixture enough to aid appreciably in fluorine removal by fusion, whereas additions of silica in amounts above a certain limit tend to prevent fluorine removal by forming a relatively impervious film over the surface of the melt. Furthermore, additions of oxides of iron and aluminum in amounts more than approximately 8 percent in fusion charges maintained at elevated temperatures such as 1550 to 1600° C. produce lower availability of phosphate in the treated material than would be expected on the basis of the amount of fluorine removed.

The principal object of this invention is to render rock phosphate available as a plant food in the shortest length of time possible, while maintaining the fused rock in the presence of water vapor. Another object of this invention is to reduce the temperature of the fusion charge necessary for the removal of fluorine from fused rock phosphate in the presence of water vapor. A further object of this invention is to simultaneously completely remove substantially all of the fluorine from rock phosphate and at the same time render the phosphorus in the resulting product substantially completely available as a plant food.

The rate of defluorination of fused rock phosphate in the presence of water vapor is controlled by the rate of diffusion of fluorine, either through the gas film at the surface of the melt or through the melt. Since diffusion through the melt is probably the controlling factor in plant scale operations at a given temperature, the fluidity of the melt at such temperature is of particular importance. The fluidity of the melt may be increased by increasing the temperature of the melt, but with operations involving temperatures of the order of 1500 to 1600° C., any increase in temperature is definitely undesirable, particularly in respect to the effect of the melt on refractories used. An increase in the fluidity of the melt corresponding to the effect obtained by substantially increasing the temperature of the melt may be secured by the use of a particular type or charge without the disadvantage of having to increase the temperature of treatment with water vapor.

The present invention is directed to the discovery that the fluidity of the melt is greatly increased by adjusting the composition of the charge to be fused, so that there is present a minimum of approximately 3 mols of acidic oxide ($SiO_2$, $Al_2O_3$, $FeO$ or $Fe_2O_3$, etc.) per mol of excess lime (that CaO in excess of the tricalcium orthophosphate equivalent in the rock), at least approximately 2 of said 3 mols of acidic oxide being $SiO_2$, the remainder being either $SiO_2$, $FeO$, $Fe_2O_3$, $Al_2O_3$, or any mixture of these oxides.

The present invention is directed to the treatment of fused rock phosphate with water vapor to remove fluorine and render the $P_2O_5$ content of the rock phosphate available as plant food, wherein a charge of rock phosphate is produced by adjustment of certain constituents to obtain a predetermined molal ratio between these and other constituents of the rock. This adjustment is obtained by the use of acidic oxide materials to form certain relationships in respect to the alkaline oxide material (CaO) contained in the rock. An analysis of rock phosphates invariably shows a CaO and $P_2O_5$ content wherein there is an excess of CaO over that equivalent to tricalcium orthophosphate ($3CaO.P_2O_5$) based on the $P_2O_5$ content. In the present invention this excess CaO is used as the basis for determining the amount of acidic oxide material which is to be used in preparing the fusion charge. Incidentally, account must be taken of the acidic oxide materials ($SiO_2$, $FeO$ or $Fe_2O_3$, $Al_2O_3$, etc.) naturally present in the rock phosphate since the adjustment is made by way of adding additional acidic oxide material to produce the predetermined composition. In any event, the charge is prepared by the addition of silica, if necessary, so that there are at least approximately 2 mols of $SiO_2$ for each mol of excess CaO and, in addition, is adjusted by the addition of $SiO_2$, FeO or $Fe_2O_3$, $Al_2O_3$, or mixtures of these materials until there is present at least 1 additional mol of acidic oxide material for each mol of excess CaO. The composition of the charge will generally be such that its tricalcium orthophosphate equivalent is between 55 and 80 percent. A further dilution would result in a product which would tend to be uneconomical due to its low $P_2O_5$ content.

The following are examples of compositions corresponding to the above requirements:

1 mol $3CaO.P_2O_5$   0.45 to 0.8 mol ($CaO \cdot FeO \cdot 2SiO_2$)
1 mol $3CaO.P_2O_5$   0.45 to 0.8 mol ($CaO \cdot 0.3FeO \cdot 2.7SiO_2$)
1 mol $3CaO.P_2O_5$   0.45 to 0.8 mol ($CaO \cdot 0.6FeO \cdot 0.2Al_2O_3 \cdot 2.2SiO_2$)

The first of these compositions corresponds to a mixture of tricalcium orthophosphate and the mineral hedenbergite. All of these compositions have been found to be effective not only in reducing the fusion temperature of the charge, but also in increasing the relative fluidity of the charge at temperatures immediately above the fusion temperature. The composition containing the hedenbergite equivalent appears to be particularly effective for this purpose.

Examples of the effect of the composition of the charge insofar as the removal of fluorine is concerned, together with the simultaneous effect upon the availability of the product as a plant food, are given for charges prepared from rock phosphate to produce mixtures containing various amounts of tricalcium orthophosphate and hedenbergite. The rock phosphates used had the following composition: $P_2O_5$, 37.6%; CaO, 51.6%; $SiO_2$, 0.90%; $Fe_2O_3$, 1.83%; $Al_2O_3$, 1.3%; $F_2$, 3.94%; $CO_2$, 1.0%; S, 0.3%; and a fusion temperature of approximately 1600° C. as represented by the drip temperature method of determination. Each charge was maintained in an atmosphere containing 10 percent water vapor at 1550° C. for thirty minutes and immediately thereafter was quenched. The drip temperature, the total unavailable $P_2O_5$ content of the product, and the extent of fluorine removed is shown in the table below:

| Per cent $Ca_3(PO_4)_2$ in fused product | Drip temp. of charge, °C. | Per cent of $P_2O_5$ in product | | Per cent of $F_2$ removed |
| --- | --- | --- | --- | --- |
| | | Total | Made avail. | |
| 54.2 | 1,457 | 24.8 | 79.5 | 100 |
| 61.2 | 1,485 | 28.1 | 88.3 | 100 |
| 71.3 | 1,462 | 32.7 | 86.6 | 98.3 |
| 73.2 | 1,458 | 33.5 | 86.9 | 99.1 |
| 76.5 | 1,464 | 35.0 | 87.5 | 98.4 |
| 79.0 | 1,468 | 36.2 | 85.6 | 98.7 |
| 80.2 | 1,475 | 36.7 | 68.6 | 83.2 |
| 84.7 | 1,500 | 38.8 | 58.3 | 73.1 |

The defluorination of rock phosphate in accordance with the present invention shows certain distinct advantages; namely, very fluid melts are obtained at temperatures around 1500° C., at a given temperature above the fusion point the rate of defluorination of the tricalcium orthophosphate-hedenbergite mixture, for example, is two to three times that obtained when using rock phosphate alone, the defluorination process can be carried out at a lower temperature than would be practical if the charge were rock alone, and the product from the fusion is suitable for use as a fertilizer without further chemical treatment.

It will be seen, therefore, that this invention actually may be carried out by the use of various modifications and changes without departing from its spirit and scope.

I claim:

1. A process of rendering fluorine containing rock phosphate available as plant food which comprises (a) preparing a fusion charge of rock phosphate and added acidic oxide material in proportions such that for each mol of CaO in said rock in excess of the tricalcium orthophosphate equivalent thereof, there is present in the charge so prepared (1) substantially 2 mols of $SiO_2$, and (2) substantially 1 mol of additional acidic oxide materials selected from the group consisting of FeO and $Al_2O_3$, whereby said charge has a fusion temperature substantially below the fusion temperature of said rock phosphate alone, and the melt resulting therefrom has a relatively low viscosity at temperatures immediately above its fusion temperature, (b) fusing the charge so prepared, and (c) contacting the fused charge with a water-containing atmosphere for a time sufficient to remove a substantial proportion of the fluorine therefrom and render the phosphorus content thereof available as plant food.

2. A process of rendering fluorine containing rock phosphate available as plant food which comprises (a) preparing a fusion charge of rock phosphate and added acidic oxide material in proportion such that for each mol of CaO in said rock in excess of the tricalcium orthophosphate equivalent thereof, there are present in the charge so prepared the constituents required for the formation of hedenbergite ($CaO.FeO.2SiO_2$) therefrom, whereby said charge has a fusion temperature substantially below the fusion temperature of said rock phosphate alone, and the melt resulting therefrom has a relatively low viscosity at temperatures immediately above its fusion temperature, (b) fusing the charge so prepared, and (c) contacting the fused charge with a water-containing atmosphere for a time sufficient to remove a substantial proportion of the fluorine therefrom and render the phosphorus content thereof available as plant food.

3. A process of rendering fluorine containing rock phosphate available as plant food which comprises (a) preparing a fusion charge of rock phosphate and added acidic oxide material in proportions such that for each mol of CaO in excess of that required to form tricalcium orthophosphate in said rock there are present added constituents required for the formation of one mol of hedenbergite ($CaO.FeO.2SiO_2$) for between 2 to 3 mols of tricalcium orthophosphate ($3CaO.P_2O_5$) therein, whereby said charge has a fusion temperature substantially below the fusion temperature of said rock phosphate alone, and the melt resulting therefrom has a relatively low viscosity at temperatures immediately above its fusion temperature, (b) fusing the charge so prepared, and (c) contacting the fused charge with a water-containing atmosphere for a time sufficient to remove a substantial proportion of the fluorine therefrom and render the phosphorus content thereof available as plant food.

KELLY L. ELMORE.